(12) United States Patent
Berube et al.

(10) Patent No.: US 9,181,782 B2
(45) Date of Patent: Nov. 10, 2015

(54) APPARATUS AND METHOD FOR ISOLATING A SECTION OF A PIPE RISER BORE IN THE COURSE OF RISER RENEWAL

(71) Applicant: Car-Ber Investments Inc., Wallaceburg (CA)

(72) Inventors: Guy Berube, Sarnia (CA); Graham T. Brown, Sarnia (CA); Tom Blair, Port Lambton (CA)

(73) Assignee: Car-Ber Investments Inc., Wallaceburg, Ontario (CA)

( * ) Notice: Subject to any disclaimer, the term of this patent is extended or adjusted under 35 U.S.C. 154(b) by 0 days.

(21) Appl. No.: 14/244,017

(22) Filed: Apr. 3, 2014

(65) Prior Publication Data

US 2014/0299327 A1  Oct. 9, 2014

Related U.S. Application Data

(60) Provisional application No. 61/809,284, filed on Apr. 5, 2013.

(51) Int. Cl.

| E21B 33/12 | (2006.01) |
| E21B 33/128 | (2006.01) |
| E21B 23/00 | (2006.01) |
| E21B 41/00 | (2006.01) |

(52) U.S. Cl.
CPC .............. *E21B 41/0007* (2013.01); *E21B 33/12* (2013.01); *E21B 33/128* (2013.01)

(58) Field of Classification Search
CPC ......... E21B 23/00; E21B 29/12; E21B 33/12; E21B 23/128; E21B 41/0007

USPC ............... 166/337, 351, 373, 387; 138/89, 90
See application file for complete search history.

(56) References Cited

U.S. PATENT DOCUMENTS

| 3,483,894 | A | * | 12/1969 | Finocchiaro | 138/90 |
| 3,577,737 | A | * | 5/1971 | Burleson | 405/227 |
| 4,381,800 | A | * | 5/1983 | Leslie | 138/90 |
| 5,038,818 | A | * | 8/1991 | Jiles | 137/317 |
| 5,844,127 | A | * | 12/1998 | Berube et al. | 73/49.8 |
| 6,035,898 | A | * | 3/2000 | Dominguez | 138/89 |
| 6,131,441 | A | * | 10/2000 | Berube et al. | 73/49.8 |
| 6,463,791 | B1 | | 10/2002 | Berube et al. | |
| 7,171,987 | B2 | * | 2/2007 | Serret | 138/89 |
| 7,240,697 | B2 | * | 7/2007 | Beebe et al. | 138/89 |
| 7,389,818 | B2 | * | 6/2008 | Hoiland | 166/367 |
| 7,779,676 | B2 | * | 8/2010 | Carson | 73/49.5 |
| 8,235,123 | B2 | * | 8/2012 | Stokka et al. | 166/357 |
| 8,720,585 | B2 | * | 5/2014 | Mothaffar | 166/363 |
| 8,851,184 | B2 | * | 10/2014 | Deslierres et al. | 166/363 |
| 8,910,715 | B2 | * | 12/2014 | Linderman et al. | 166/363 |
| 2008/0121044 | A1 | | 5/2008 | Carson | |
| 2011/0204052 | A1 | * | 8/2011 | Carson et al. | 220/237 |
| 2011/0303421 | A1 | * | 12/2011 | Mickey | 166/386 |

* cited by examiner

*Primary Examiner* — Matthew Buck
(74) *Attorney, Agent, or Firm* — Marsh Fischmann & Breyfogle LLP; Jonathon A. Szumny

(57) ABSTRACT

The isolation tool works at depth in the bore of a pipe whose upper end is to be severed and replaced. The tool isolates the lower pipe bore from the upper bore so that flammable downhole fluid is prevented from reaching a welding site along the pipe wall. The tool incorporates: means for establishing a pair of axially spaced apart annular seals engaging the pipe inner surface; means for venting downhole fluid to ground surface; and means for monitoring for seal leakage. The tool is primarily mechanical in nature. It finds use in connection with off-shore platform riser renewal operations.

6 Claims, 23 Drawing Sheets

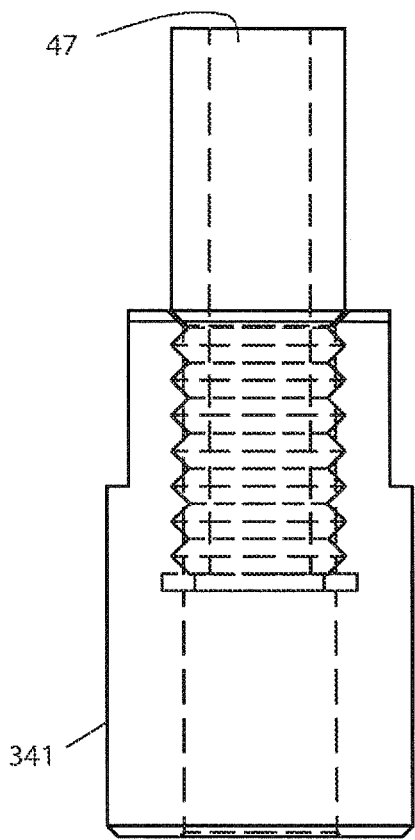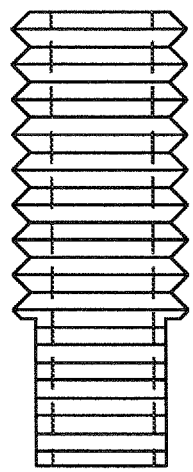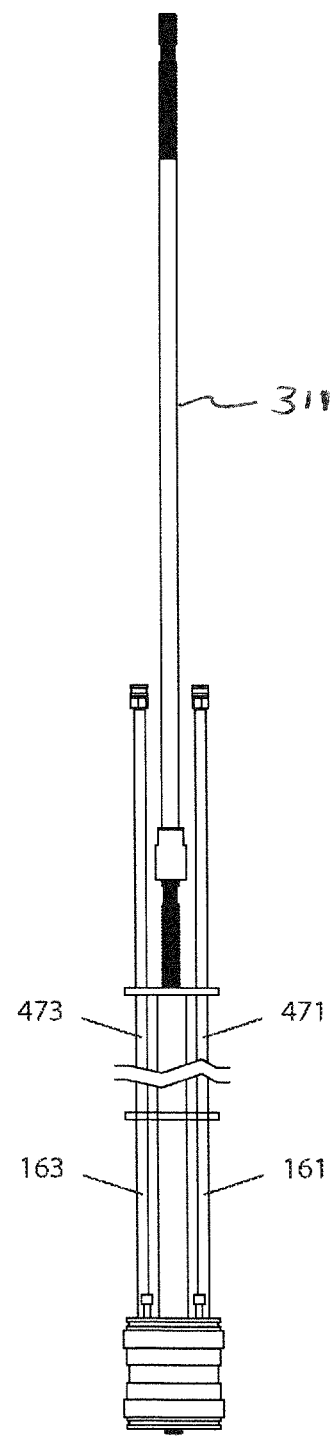
Figure 19　　　　　　　　Figure 20

APPARATUS AND METHOD FOR ISOLATING A SECTION OF A PIPE RISER BORE IN THE COURSE OF RISER RENEWAL

RELATED APPLICATIONS

This application claims priority to U.S. Provisional Patent Application No. 61/809,284, filed Apr. 5, 2013, entitled "TESTING AND ISOLATING APPARATUS AND METHOD FOR RISERS," the entirety of which is incorporated herein by reference as if set forth in full.

FIELD OF THE INVENTION

The invention relates to a mechanical assembly or "isolation tool" for use in controlling fluid movement through a pipe bore during the course of replacing a section of the pipe. For example, the tool may be used in connection with the process of replacing the worn or damaged upper section of a vertical "riser" associated with an off-shore oil or gas production platform. The invention further relates to a method associated with the pipe section replacement procedure.

BACKGROUND OF THE INVENTION

The invention was developed in connection with providing an isolation tool which could be used 'downhole' in connection with the process of replacing the upper section of an upwardly oriented riser associated with an off-shore oil or gas production platform. Such platforms are prevalent in the Gulf coast region of the U.S. It will be described herein in that connection. However, it is contemplated that the tool and method may find application in other fields of use as well and is not limited to downhole applications in upwardly oriented pipes.

The word "riser" is commonly used to identify a steel pipe extending up from the sea floor to a production platform. Oil or natural gas is produced through the bore of the riser from one or more wells connected to it.

Many of these risers have been in use for decades in the Gulf coast region. As a consequence, in many cases their upper sections have become weakened and worn by wave action, corrosion and other damaging actions. The well operators pay close attention to this deterioration and will initiate replacement of the upper section of the riser when appropriate.

Typically the prior art replacement operation has involved:
  closing the valves of the sea floor wellhead(s) to terminate production into the base of the riser;
  setting a packer at depth in the riser bore (for example, this might take place at a depth of up to 40' below the platform), so as to provide a barrier sealing off or isolating the upper section of the riser bore from its lower section;
  severing the riser wall at a point above the packer with a mechanical cutting tool;
  removing the severed upper section of the riser and lowering a replacement pipe section into its place; and
  welding the new riser section end to end to the old section.

It follows that one needs to isolate the pipe wall area, where welding is to occur, from the flammable gas which may still be present in the bore of the riser.

Heretofore there have been various downhole tools employed to so control the riser bore. In one case, a pig-type device or packer is displaced to the appropriate depth in the bore and then actuated from ground surface by means of an electronic signal. Upon actuation, the packer mechanically expands its seal element radially into sealing engagement with the pipe wall and anchors itself to the wall, thereby providing a barrier to gas movement along the inner surface of the upper pipe segment.

These prior art tools are closely held and are not publically disclosed in detail in the literature, to our knowledge. However, we understand that they are characterized by several shortcomings, including that:
  the tools are complex and their use entails lengthy set-up times;
  the tools are not adapted to monitor and provide a real time indication of the on-going competence or possible leakage of the packer seal element; and
  rental of the known tools is expensive.

It is therefore one object of the present invention to provide an isolation tool for use downhole that can be comparatively quickly installed and deployed at the desired depth in a riser bore.

It is another object to provide a tool adapted to provide a real time indication of seal competency or leakage.

And it is another object to provide a tool which, due to the simplicity of its structure and operation, can be supplied at less cost than has been common in the past.

If the tool is to be used at an off-shore platform, it is desirable that it be adapted to be insertable into the riser inlet within the space available. While these platforms are huge structures, the space available to feed an isolation tool into the open upper end of the riser bore is commonly very limited. Typically there might be only about 2½-6' of "head room" available at the riser inlet. It therefore is a preferred object of the invention to provide a tool which is adapted to be fed into the pipe bore in spite of the usual space limitations at the inlet.

If the tool is to be used in the context of an off-shore platform riser, it is desirable that it remain cohesive in use. Dropping a steel part down the riser bore is unacceptable to the well operator. It therefore is a preferred object to provide a tool whose components are well tied together to maintain its cohesiveness while still allowing tool components to move to a limited extent in the course of 'setting' the tool.

If the tool is to be used in close proximity to a welding operation, it is desirable to avoid heat damage of the elastomer seals. It therefore is another preferred object to provide a tool adapted to protect the seals against deterioration from heat.

SUMMARY OF THE INVENTION

In one aspect, the present invention provides a primarily mechanical isolation tool adapted for use downhole. The tool is designed to work at depth within the bore of a pipe, such as an upwardly oriented riser associated with an off-shore production platform.

The tool provides a sealed pressurized barrier internally dividing the pipe bore into upper and lower sections. The barrier functions to block fluid movement along the inner surface of the pipe. But the tool also provides a conduit extending upwardly to the pipe's open end, for venting rising bore fluid at ground surface. The barrier is actuated or 'set' from ground surface by mechanical means extending down through the upper section of the bore.

In addition, the tool incorporates a system for monitoring, at ground surface, whether the downhole seal elements are leaking and it further preferably incorporates means for tieing tool components together so as to ensure cohesiveness.

One embodiment of the downhole isolation tool, when used in the pipe, comprises, in combination:

a support frame, at ground surface, for engaging the upper end of the pipe and supporting and anchoring downwardly extending segments of the tool;

an isolation assembly for positioning lengthwise in the pipe bore at depth, said assembly comprising a linear assemblage of components including a front plate, a front seal element, a central body, a back seal element and a back plate, said seal elements being axially spaced apart, resilient, deformable and annular, each said seal element being positioned between one end of the body and a plate, whereby, when the plates and body are compressed together, the seal elements are squeezed and deformed outwardly into sealing engagement with the pipe and thereby combine with the outer surface of the body and the inner surface of the pipe to form a sealed annular space;

a tubular housing assembly, preferably comprising a string of tubular joints connectable end to end, suspending the isolation assembly in the pipe bore and positioning it at the desired operational depth, said housing assembly being operative to be anchored at its upper end to the support frame, said housing assembly being connected at its lower end with the front plate, whereby the front plate is held stationary and fixed in place by said housing assembly;

a tubular vent rod assembly, preferably comprising a string of tubular rods connectable end to end, connected with the back plate and slidably extending through the isolation assembly, housing assembly and bore inlet, said vent rod assembly forming a passageway communicating with the pipe bore beneath the tool for venting fluid therefrom to ground surface;

a tensioner connected with the vent rod assembly at ground surface and operative to draw said assembly upwardly to thereby compress the plates and body together and deform the seal elements so that they sealably engage the pipe, said tensioner being lockable to fix said assembly in a tensioned state;

a seal leakage monitoring assembly connected with the isolation assembly and comprising a conduit extending from ground surface for circulating pressurized liquid through the sealed annular space and back to ground surface;

whereby the isolation assembly provides a sealing barrier having a pair of annular seal elements sealing against the pipe's inner surface at axially spaced apart positions, the vent rod assembly provides a passageway for segregated venting of pipe bore fluid from the pipe bore's lower section through the barrier to ground surface and said vent rod assembly additionally functions when pulled and tensioned to actuate the isolation assembly, the housing assembly is operative to lower, hold and recover the isolation assembly and fixes the front plate in position to enable compression of the isolation assembly and the monitoring assembly functions to provide an indication as to whether the seal elements are leaking.

In a preferred optional feature, the back plate is connected by floating locking pins with the back end of the body, said pins being positioned internally of the body in bores which permit limited axial movement of the pins and back plate but the body has shoulders which prevent separation of the back plate and body. In addition, the front plate is connected with the body by locking pins which permit limited axial movement of the body toward the front plate. As a consequence of this arrangement the vent rod assembly can pull the back plate and body toward the front plate and thereby squeeze the seal elements to actuate the isolation assembly, while the locking pins still ensure cohesiveness of the isolation assembly.

BRIEF DESCRIPTION OF THE DRAWINGS

These and other features of the invention will become more apparent in the following detailed description in which reference is made to the appended drawings wherein:

FIG. 19 is a partial cut-away side view of a coupling positioned to connect a vent rod extension to the vent rod string;

FIG. 20 is a side view of the coupling and the vent rod extension of FIG. 19 attached to the isolation assembly;

DETAILED DESCRIPTION OF THE PREFERRED EMBODIMENT

Throughout the description the following terms will be assumed to have the following meanings:

"Axial"—this term is used to indicate a direction along the longitudinal axis of the pipe and tool. Thus, the term "axially extending" will be understood to mean extending in a direction parallel to the longitudinal axis of the pipe.

"Front" and "back" and "upper" and "lower"—these terms are used interchangeably to describe the positions of various components of the tool. The terms "front" and "upper" indicate a position closer to the open end of the pipe. The terms "back" and "lower" indicate a position away from the open end of the pipe.

"Ground surface" is intended to mean the off-shore platform (not shown) or an alternative surface structure adjacent the upper end of the pipe.

Figure 1:
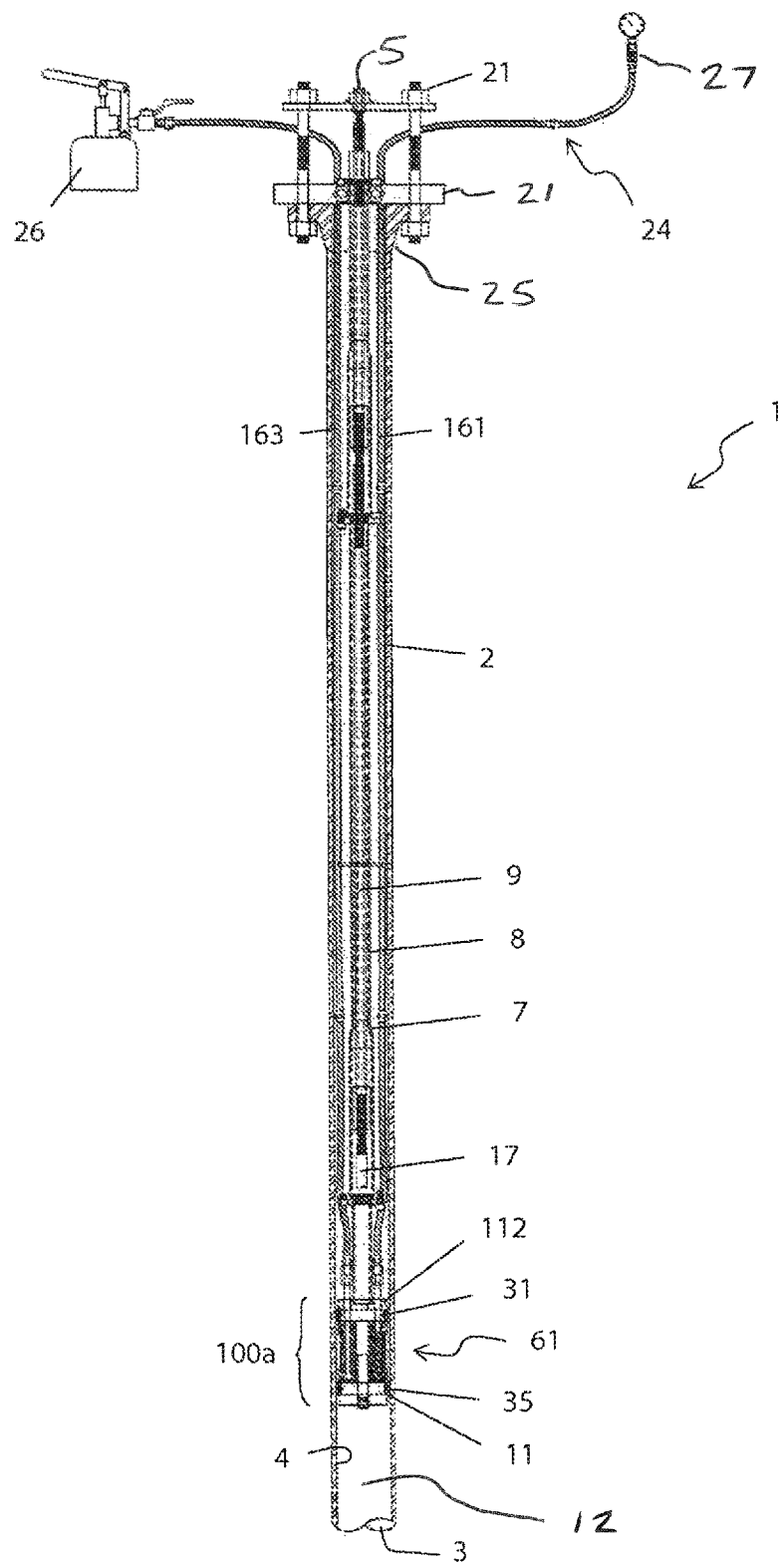
FIG. 1 is a side view of the downhole isolation tool, fully assembled and positioned at depth in a riser.

The isolation tool 1 is shown assembled and ready to operate in FIG. 1. It is illustrated in FIGS. 26-29 as inserted in an upwardly oriented pipe 2, such as an off-shore platform riser whose upper end is to be replaced. The isolation tool 1 will be described herein below in that context, although it is contemplated that it could be applied in a horizontal pipe as well.

The isolation tool 1 comprises a combination of assemblies which can be deployed into and can work together in the bore 3 of the pipe 2 at depth (usually the depth is less than 40 feet).

The purpose of the tool 1 is to provide a sealed barrier which prevents flammable downhole fluid from migrating up along the inner surface 4 of the pipe 2 to the point where cutting and welding operations are to take place. Instead the fluid is to be vented through the tool to ground surface in a segregated way.

It is intended to provide an isolation tool 1 that is primarily mechanical in nature. The tool can be actuated from ground surface and the competence of its seals can be monitored in real time.

Having reference to FIGS. 1, 2, 3, 16, 18, 20 and 21, the isolation tool 1 comprises in general:

- an isolation assembly 100a incorporating a linear assemblage of components including: a front plate 112, a front seal element 31, a central body 61, a back seal element 35 and a back plate 11. When the components are compressed together, the axially spaced apart annular seal elements 31, 35 are deformed radially outward and seal against the inner surface 4 of the pipe 2, thereby combining with the outer surface 62 of the body 61 and the pipe inner surface 4 to define an annular sealed space 63;
- a housing assembly 7 incorporating a string 8 of tubular pipe joints 9 for lowering the isolation assembly 100a into position, holding it stationary during operation and recovering it upon completion of the work;
- a vent rod assembly 10, comprising a string 17 of tubular vent rods, which is connected with the back plate 11, communicates with the pipe lower bore 12, slidably extends through the balance of the isolation assembly 100a and up through the housing assembly 7 to ground surface. The vent rod string 17 can be pulled upwardly and tensioned from ground surface to actuate the isolation assembly 100a by compressing its components together. It also functions to vent downhole fluid through the isolation assembly 100a to ground surface;
- an actuating means, such as a long nut 651 or a hydraulic tensioner, is provided at ground surface for pulling and maintaining the vent rod string 17 in a tensioned state so that the seal elements 31, 35 engage and continue to seal against the pipe 2;
- a support means, such as a frame 21, is positioned at ground surface for engaging the pipe 2 and cooperating therewith to support and anchor the downwardly extending components; and
- a monitoring means 24, comprising conduits 161, 163 extending down through the bore of the pipe 2 from ground surface and connecting with the isolation assembly's annular sealed space 63. The monitoring means 24 circulates pressurized water down through the annular sealed space 63 and back up to ground surface. The water pressure is monitored and provides an indication in real time of seal leakage.

Figure 3:
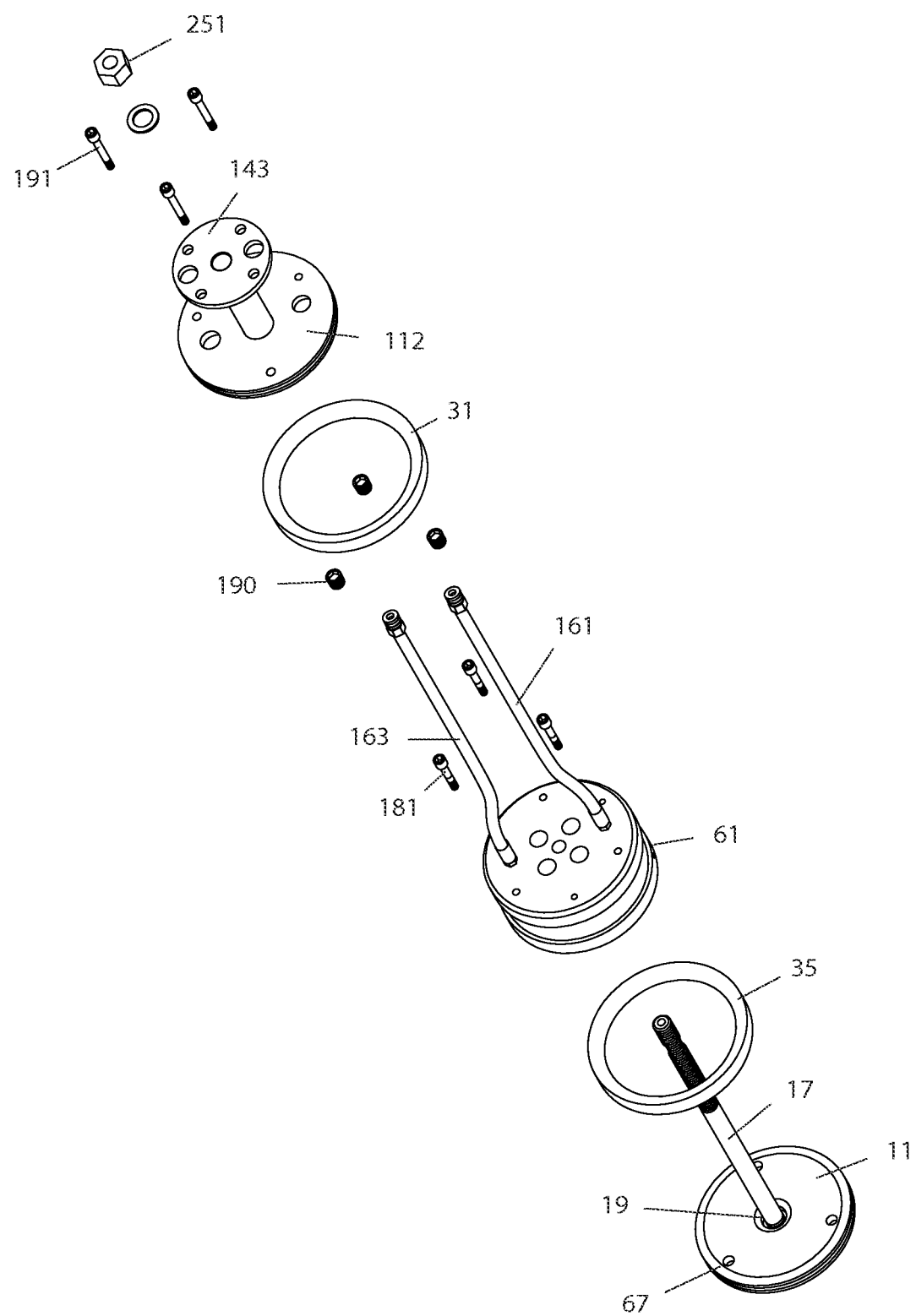
FIG. 3 is an exploded perspective view of the components of the isolation assembly of FIG. 1.
Figure 4:
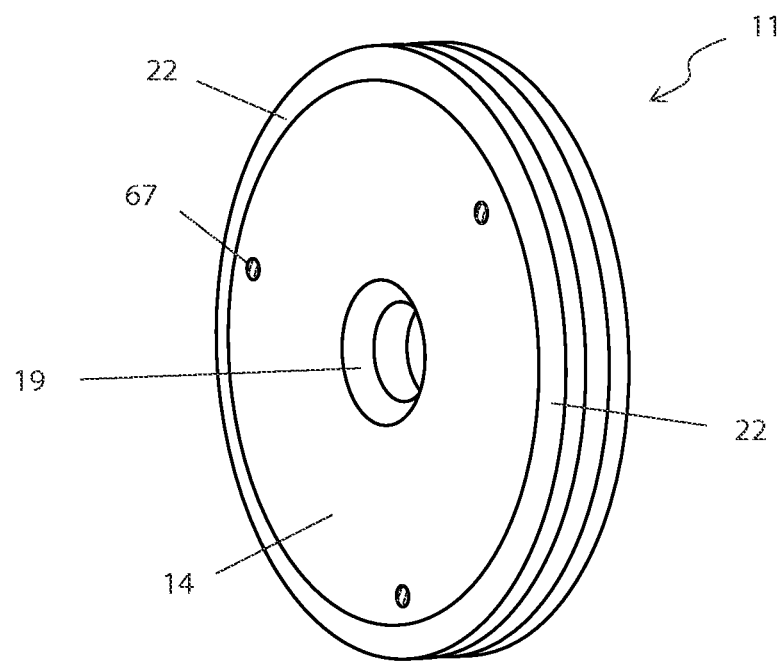
FIG. 4 is a perspective view of the back plate of the isolation assembly.
Figure 5:
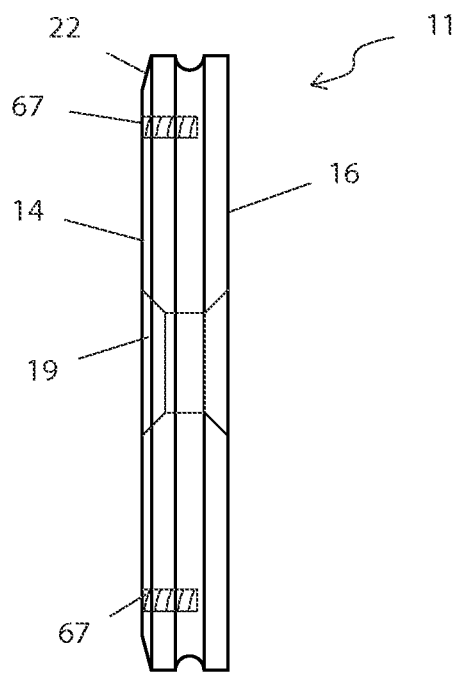
FIG. 5 is a partial sectional side view of the back plate shown in FIG. 4.

Now in greater detail and having reference to FIGS. 3-5, the back plate 11 is a circular disk having front and back faces 14, 16. At its front end, the plate 11 forms a plurality of threaded recesses 67 for receiving the threaded ends of a first set of "floating" locking pins 181. Each of the plurality of recesses 67 extend only part way into the plate 11.

The back plate 11 serves as a barrier extending transversely of the pipe bore 3. It also plays a role in the action of compressing the body 61 and plates 11, 112 together to deform the seal elements 31, 35 outwardly into sealing engagement with the pipe's inner surface 4.

Figure 6:
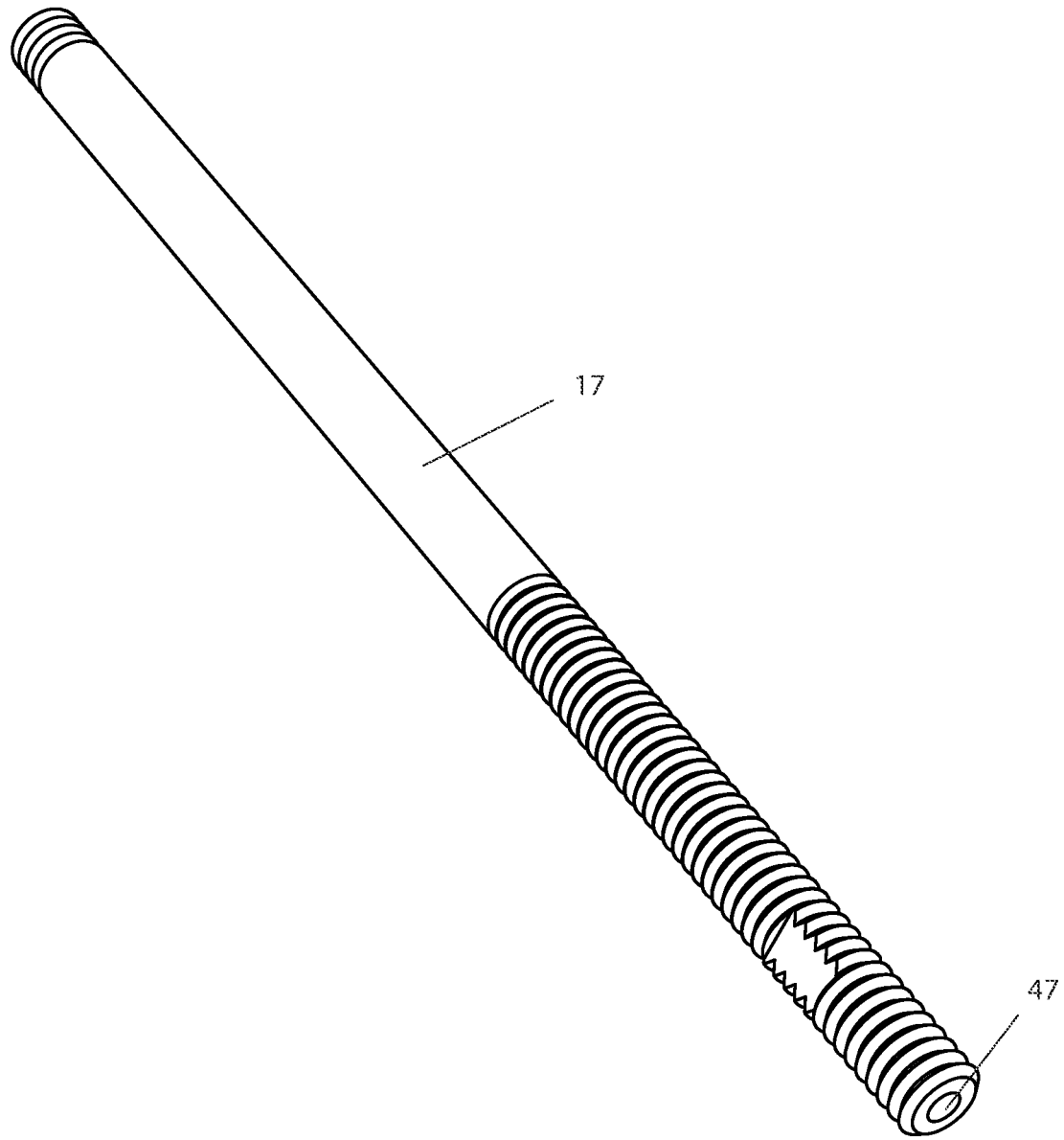
FIG. 6 is a perspective view of the vent rod of the isolation assembly.
Figure 7:
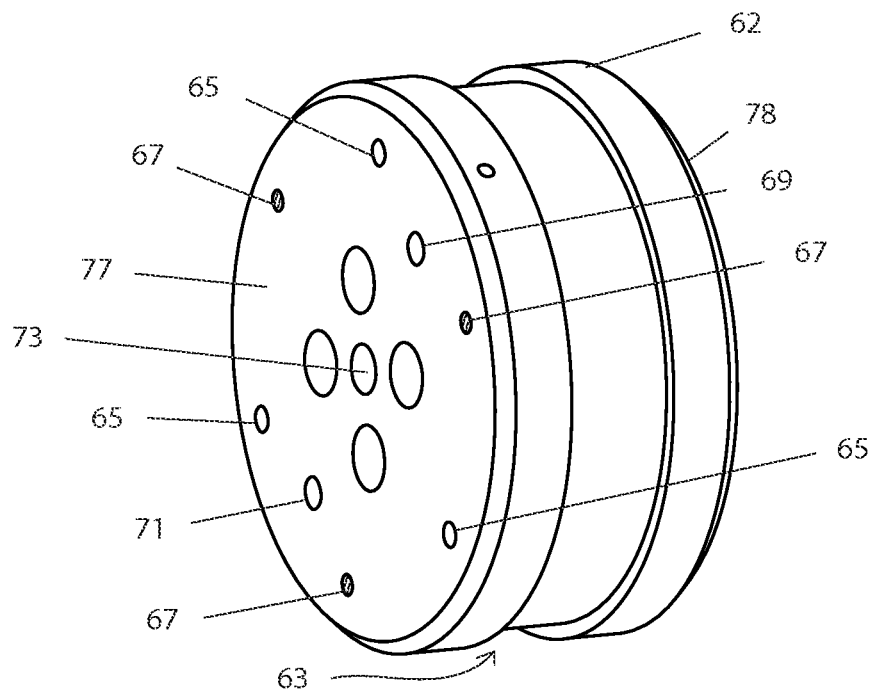
FIG. 7 is a perspective view of the body of the isolation assembly.
Figure 8:
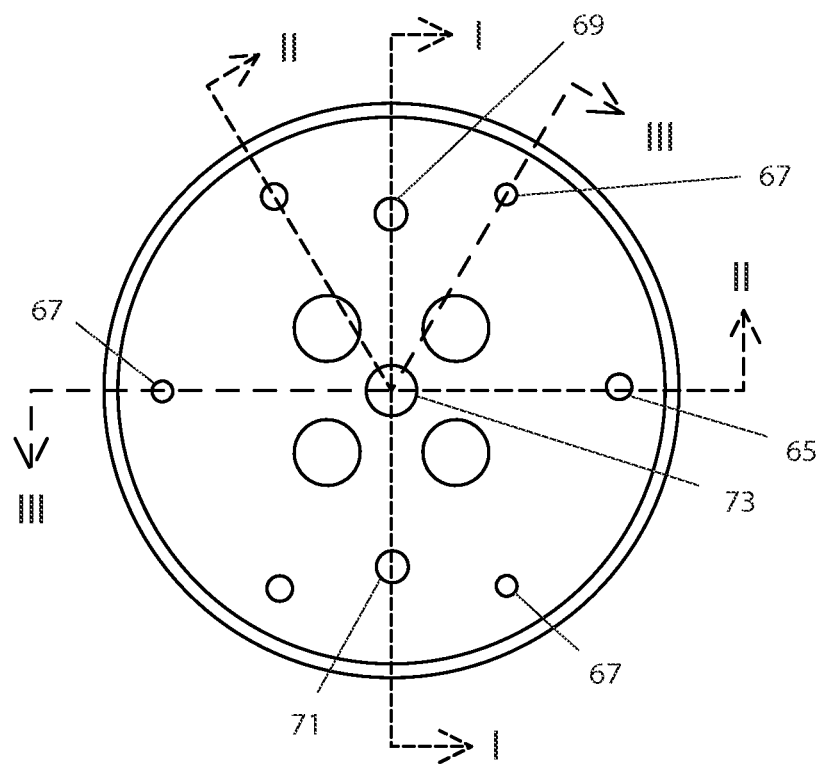
FIG. 8 is a front view of the body shown in FIG. 7.

Referring to FIGS. 4 and 5, the back plate 11 is shown as also having a central threaded aperture 19 extending therethrough, for receiving the vent rod string 17 (shown in FIG. 6).

The front face 14 of the back plate 11 is beveled along its perimeter to form an annular bevel 22. The bevel 22 is rearwardly angled, preferably at about 15°.

As previously indicated, the tubular vent rod string 17 is connected with the back plate 11 and extends through it. Having regard to FIG. 1, the string's open lower end communicates with the downhole pipe bore 12. The rod string's axial bore 47 vents downhole fluid through the isolation assembly 100a and up to ground surface. As previously indicated, rod string 17 further functions, when pulled upwardly from ground surface, to bias the back plate 11 and body 61 toward the front plate 112 and thereby compress the seal elements 31, 35. In summary, the vent rod string 17 performs two functions—it provides a means for venting downhole fluid to ground surface and it contributes to compressing the plates 11, 112 and body 61 together, to thereby deform the seal elements 31, 35.

The vent rod string 17 can be formed by adding one or more modular extension to the isolation assembly's vent rod 311. In the case where the available head room between the deck of the off-shore platform and the riser inlet is only about 3', extension rods may be only 2' in length.

The body 61 is generally cylindrical in configuration and is shown in FIGS. 7-11. It has a front face 77, a back face 78 and an outer side surface 62. The outer side surface 62 has an outer diameter that is slightly less than the inner diameter of the pipe 2 being worked in, so that an annular clearance or space 63 is defined therebetween.

The body 61 forms a plurality of through holes 65, a plurality of threaded recesses 67, a first port 69 for coupling a first monitoring conduit 161 to the body and a second port 71 for coupling a second monitoring conduit 163 to the body. It further forms a central bore 73 extending therethrough.

The central bore 73 is provided through the body 61 to allow the vent rod 311 to extend therethrough. The diameter of the body bore 73 is slightly greater than the outer diameter of the vent rod 17. As a result the body 61 is slidable on the vent rod 311.

Figure 9:
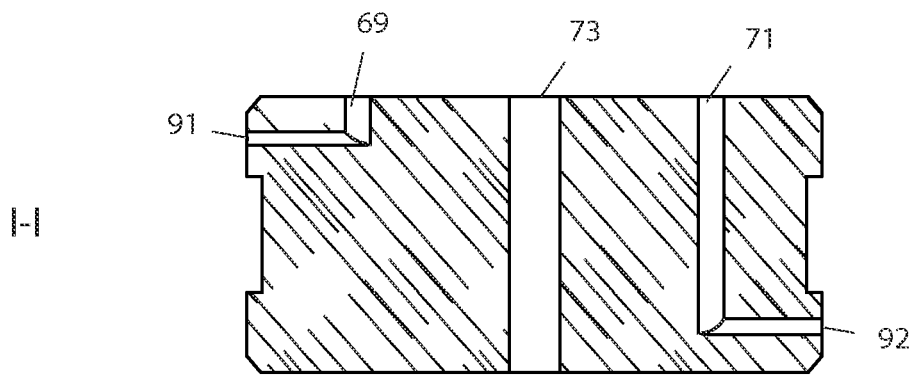
FIG. 9 is a cross-sectional view of the body taken at section line I-I in FIG. 8.

As shown in FIG. 9, the body's first port 69 connects with a first channel 91 extending radially out to the body's circumferential surface 62, at the front end of the body 61. The second port 71 connects with a second channel 92 that also extends radially out to the body's surface 62, at the back end of the body 61.

Figure 10:
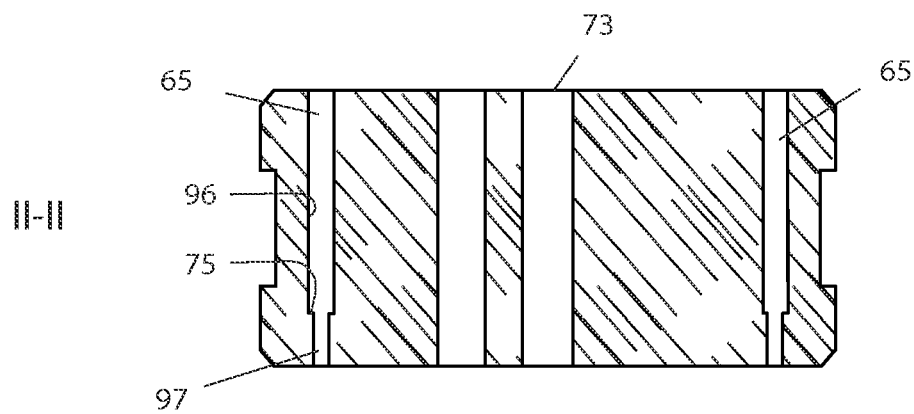
FIG. 10 is a cross-sectional view of the body taken at section line II-II in FIG. 8.

As shown in FIG. 10, each of the through holes 65 includes a larger diameter portion 96 on the front end thereof, and a smaller diameter portion 97 on the back end thereof. A ledge 75 is therefore formed at the interface between the portions 96, 97.

Figure 11:
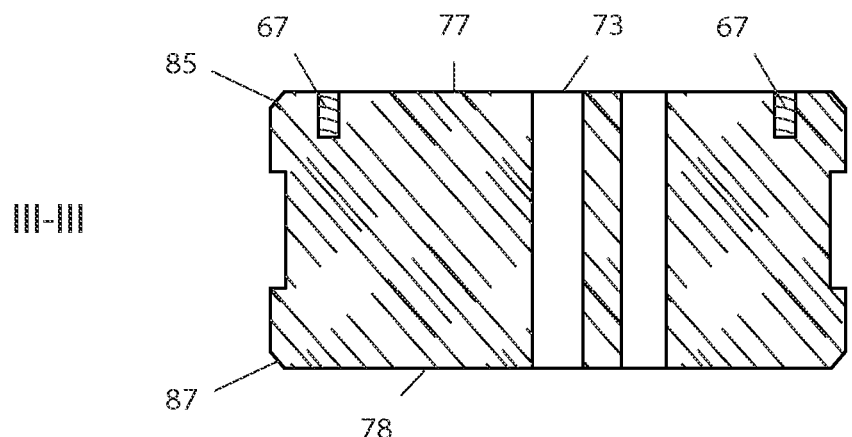
FIG. 11 is a cross-sectional view of the body taken at section line III-III in FIG. 8.

As shown in FIG. 11, the circumferential edges of both end faces 77, 78 of the body 61 are beveled to form surfaces 85, 87, respectively. The outwardly flared surfaces 85, 87 are adapted to cooperate with the annular seal elements 31, 35 to facilitate their outward radial deformation when the plates 112, 11 and body 61 are compressed together.

Figure 12:
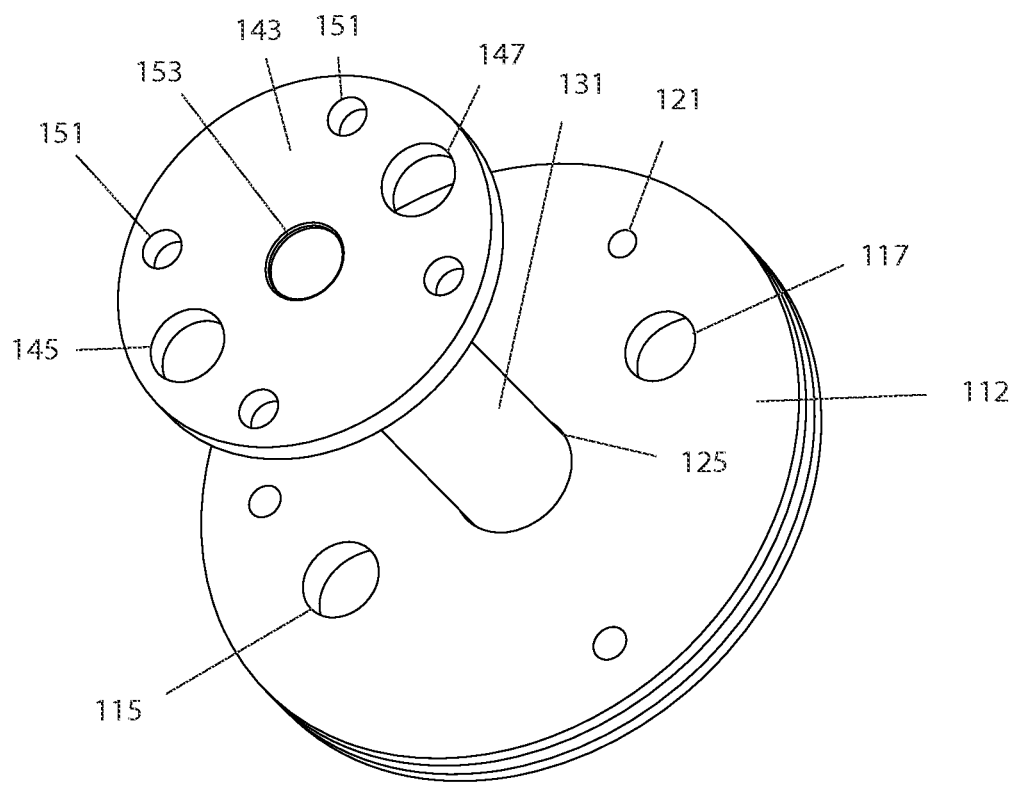
FIG. 12 is a perspective view of the front plate assembly of the isolation assembly.
Figure 13:
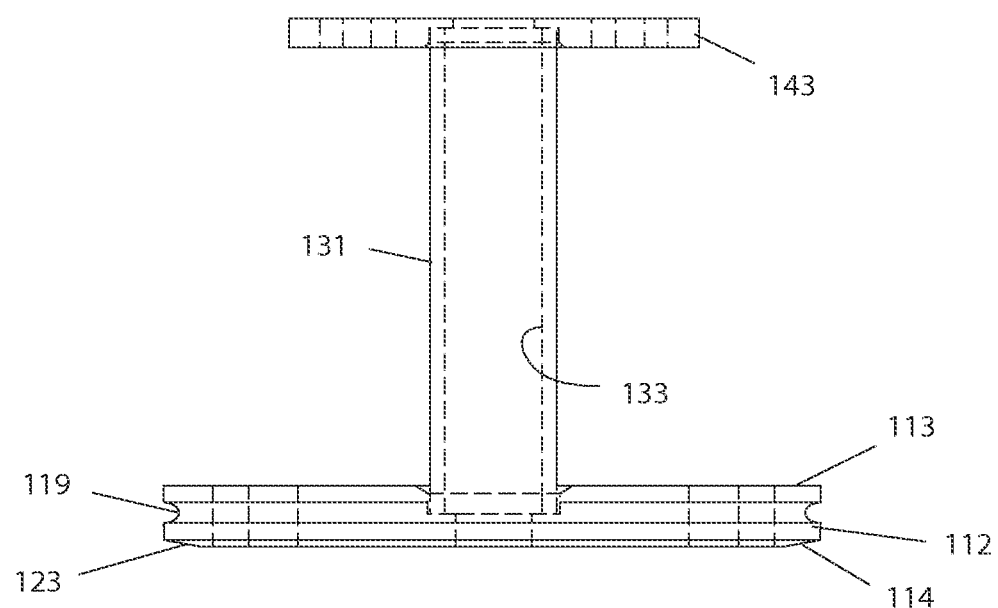
FIG. 13 is a sectional side view of the front plate assembly shown in FIG. 12.

FIGS. 12 and 13 show the front plate assembly 111, which includes a front plate 112, a flange plate 143 and a sleeve 131 extending therebetween.

The front plate 112 is a circular disk having a front face 113 and a back face 114. The front plate forms a central aperture 125, a plurality of through holes 121, a first opening 115 for the first monitoring conduit 161 to extend through and a second opening 117 for the second monitoring conduit 163 to extend through. The front plate 112 further has an outwardly flared surface or bevel 123 formed at the perimeter of its back face 114 and a circumferential groove 119 formed by its side surface. The bevel 123 is adapted to squeeze the front seal element 31 to radially deform it into sealing engagement with the inner surface of the pipe 2.

The sleeve 131 is a tubular member having a back end, a front end and a central bore 133 extending axially therethrough.

The flange plate 143 forms a threaded central aperture 153 for engaging the sleeve 131, a plurality of bolt holes 151 and openings 145, 147 for enabling the monitoring conduits 161, 163 to extend therethrough.

Figure 14:
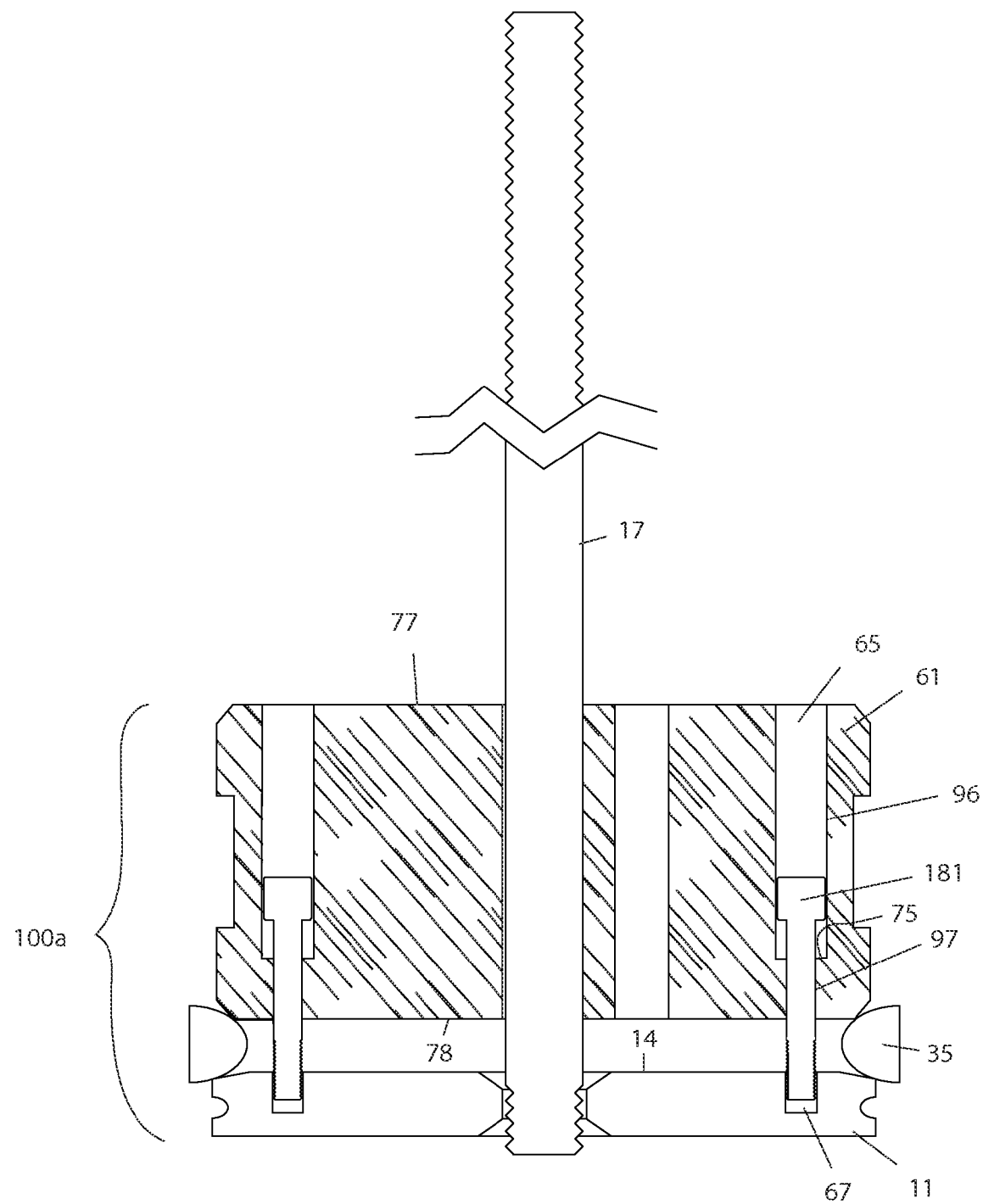
FIG. 14 is a cross-sectional partial cut-away view of the back plate, body, vent rod and a seal element in an assembled state, wherein a first set of locking pins are shown as fastening the body with the back plate.

As shown in FIG. 14, the vent rod 311 extends through the back plate 11 and central bore 73 of the body 61. Otherwise stated, the vent rod 311 is connected to the back plate 11 and extends slidably through the isolation assembly 100a.

The annular back seal element 35 is positioned between the back face 78 of the body 61 and the front face 14 of the back plate 11.

Having reference to FIG. 14, a first set of "floating" locking cap screws or pins 181 is inserted into body holes 65. Each locking pin 181 is threaded into the back plate hole 67 and extends through the smaller diameter portion 97 of the body hole 65. Pins 181 are positioned in the larger diameter portions 96 of the holes 65, such that the pin 181 can travel within the hole portions 96 but their downward travel is limited by the ledges 75. Thus, in the event that the vent rod string 17 breaks during operation, separation of the back plate 11 from the body 61 is prevented when the pins 181 contact the ledges 75.

Figure 2:
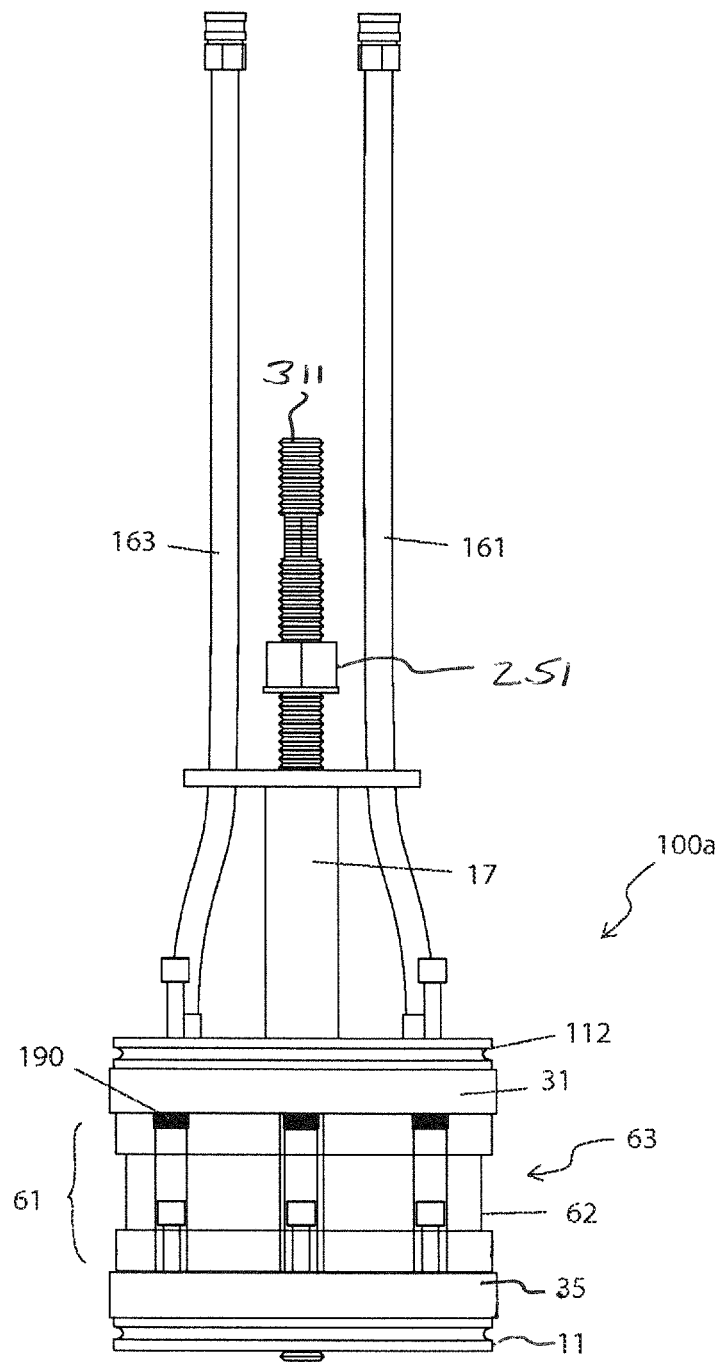
FIG. 2 is a side view of the isolation assembly.

The front end of the larger diameter portion 96 of the through hole 65 may be plugged by a cap 190 as shown in FIG. 2 to protect the locking pin 181 and to prevent foreign objects from accumulating within the through hole 65.

Figure 15:
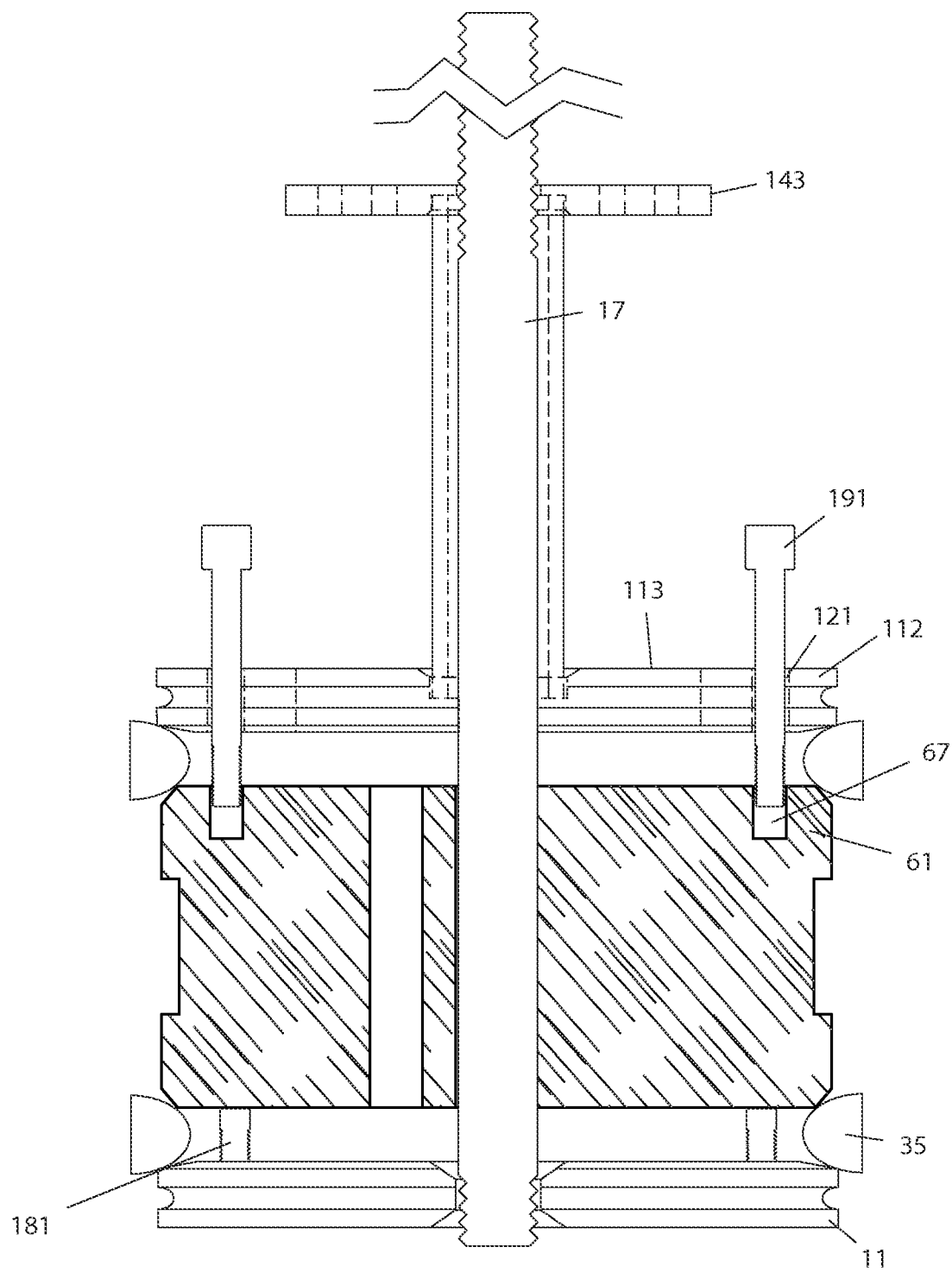
FIG. 15 is a cross-sectional partial cut-away view of part of the isolation assembly incorporating a pair of axially spaced apart seal elements, in an assembled state, wherein a second set of locking pins are shown fastening the front plate to the body.
Figure 16:
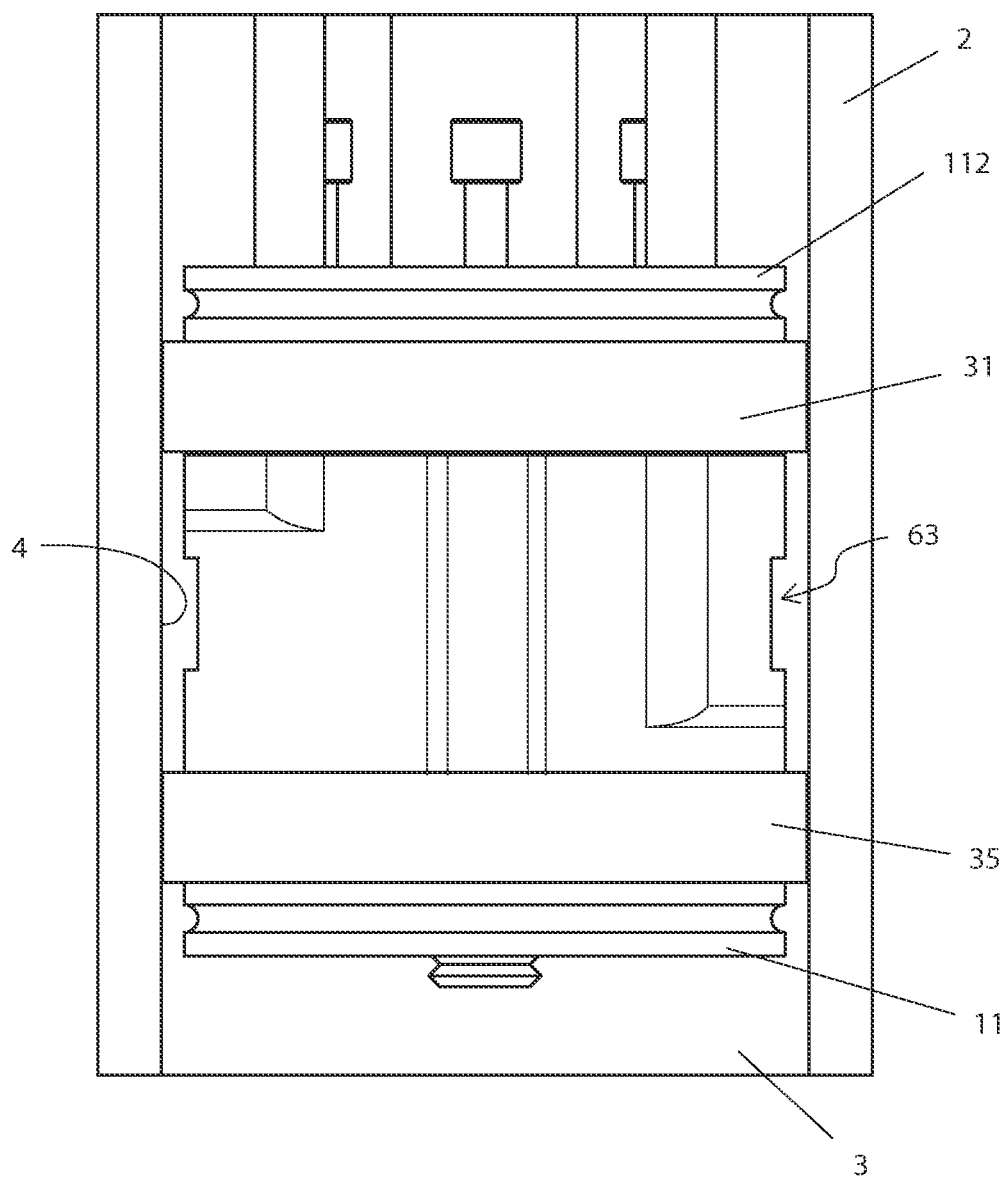
FIG. 16 is an enlarged partially cut-away side view of part of the isolation assembly positioned within a pipe in an actuated or compressed state, wherein a sealed space, defined by the body, pipe and seal elements, is shown.
Figure 17:
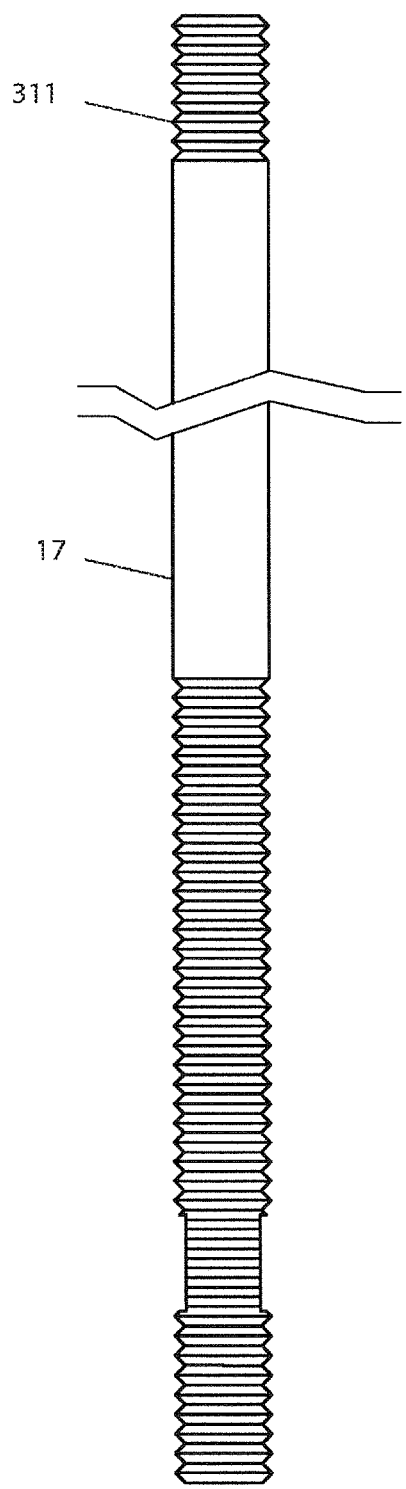
FIG. 17 is a side view of a vent rod extension.

Having reference to FIG. 15, a second set of "floating" locking pins 191 is shown. Each pin 191 extends through a hole 121 formed through the front plate 112. The pins 191 are threaded into the body threaded recesses 67. The pins 191 are of sufficient length so that, when threaded into the body recesses 67, the pins 191 are still spaced from the body front face 113. This enables the slidable body 61 to be axially displaced toward the front plate 112. However the locking pins 191 prevent the body 61 and front plate assembly from separating, as the diameter of the plate holes 121 is smaller than the diameter of the heads of the pins 191.

In summary, the two sets of locking pins 181, 191 limit the maximum separation distance between the front plate 112 and the body 61, and between the body 61 and the back plate 11, while enabling the back plate 111 and body 61 to move a short distance toward or away from the stationary front plate 112.

As previously indicated, the seal elements 31, 35 are annular and formed of deformable, resilient material, such as buna rubber. Preferably they have a D-ring configuration with a rounded inner surface profile and a flat outer surface.

To complete the isolation assembly 100a, a lock nut 251 may be screwed onto the front end of the vent rod string 17 to abut the flange plate 143. The monitoring conduits 161, 163 are connected to the body ports 69, 71.

The isolation assembly 100a may be operated and its seal elements monitored from ground surface.

Operation of the isolation assembly 100a involves: pulling the vent rod string 17 upwardly at ground surface with a tensioner such as a hydraulic tensioner (not shown) or a long nut 5, thereby drawing the back plate 11 and body 61 upwardly so that they press against the stationary fixed front plate 112 and squeeze the annular seal elements 31, 35 between the beveled surfaces 22, 87, 85, 123, whereby the seal elements 31, 35 deform and extend outwardly to seal effectively against the circular inner surface 4 of the pipe 2, thereby combining with the body 61 and pipe 2 to define the sealed annular space 63; then locking the vent rod string 17 in a tensioned condition so as to maintain the seal; circulating water or the like under pressure from ground surface and through the conduits 161, 163 and sealed space 63, to provide an indication as to whether seal leakage is occurring; and eventually releasing the vent rod string 17 so as relax it and the seal elements whereby the tool may be withdrawn.

Figure 18:
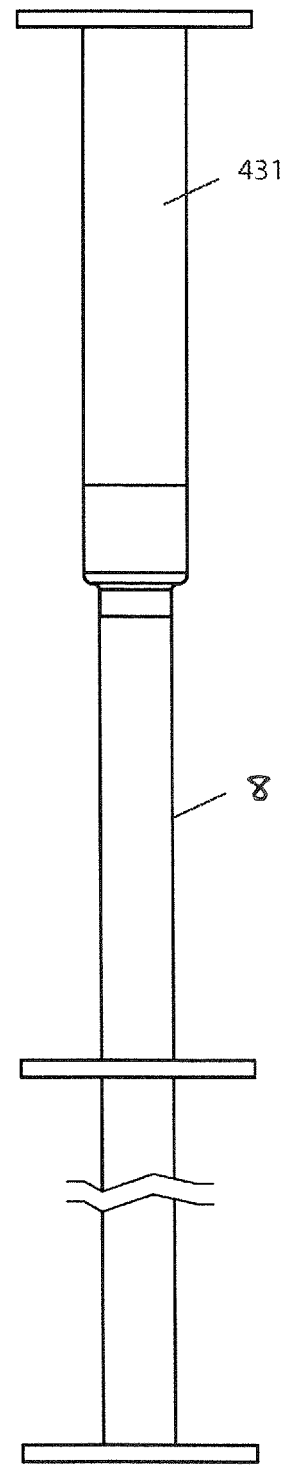
FIG. 18 is a side view of a modular housing string formed by joints joined end to end.
Figure 21:
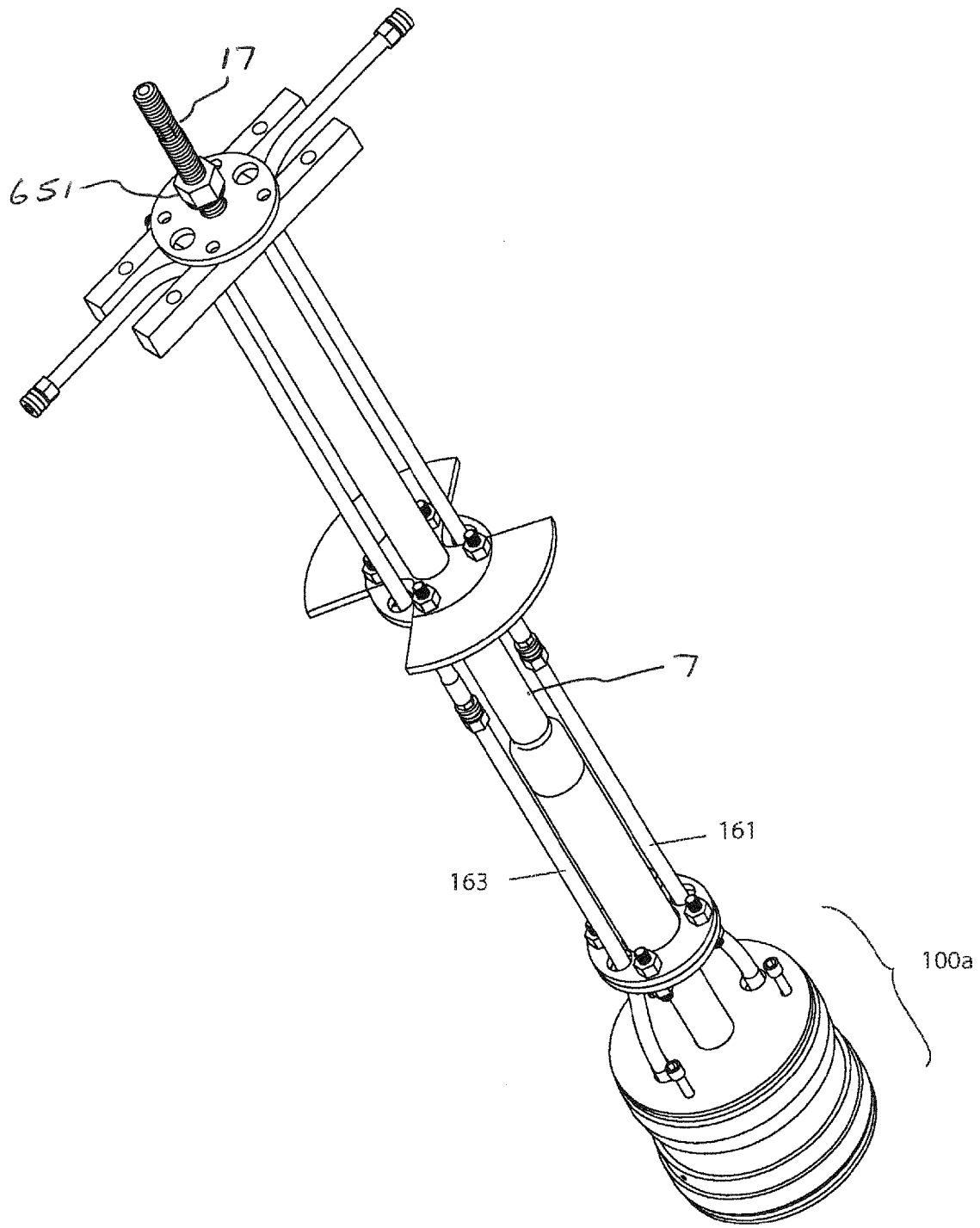
FIG. 21 is a perspective view showing an embodiment of the fully assembled downhole isolation tool.
Figure 22:
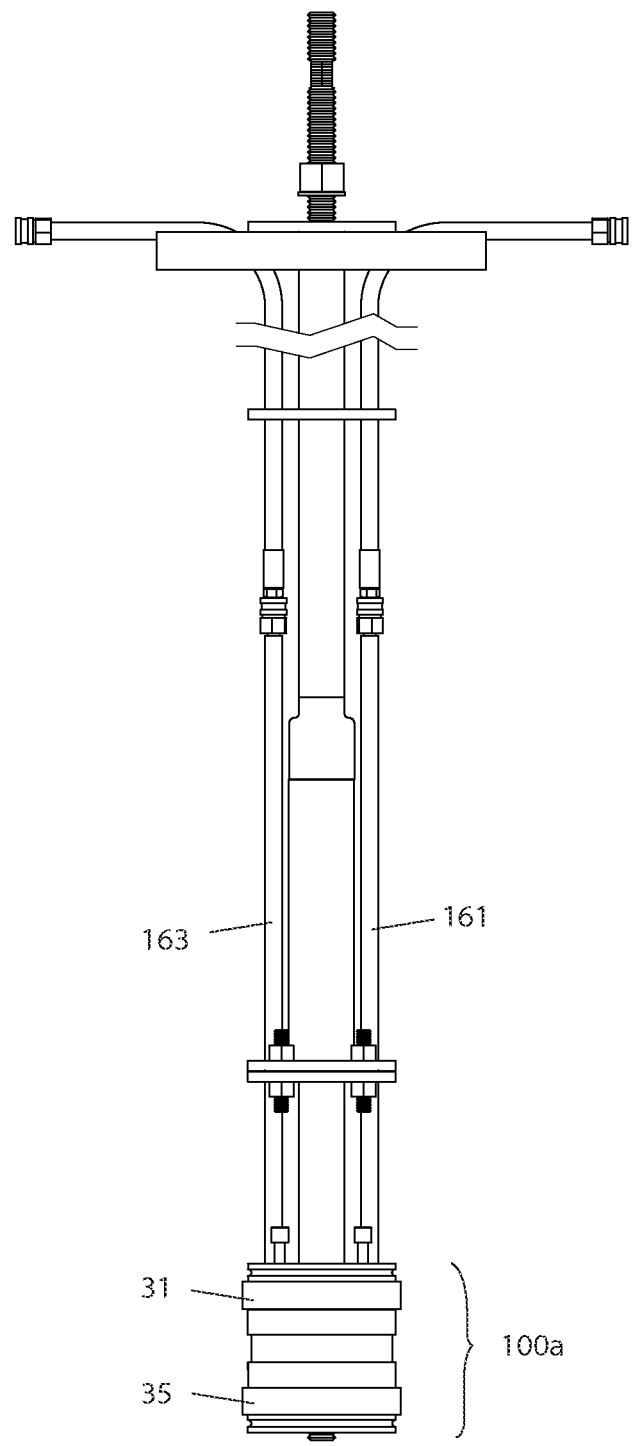
FIG. 22 is a side view of the tool shown in FIG. 21.
Figure 23:
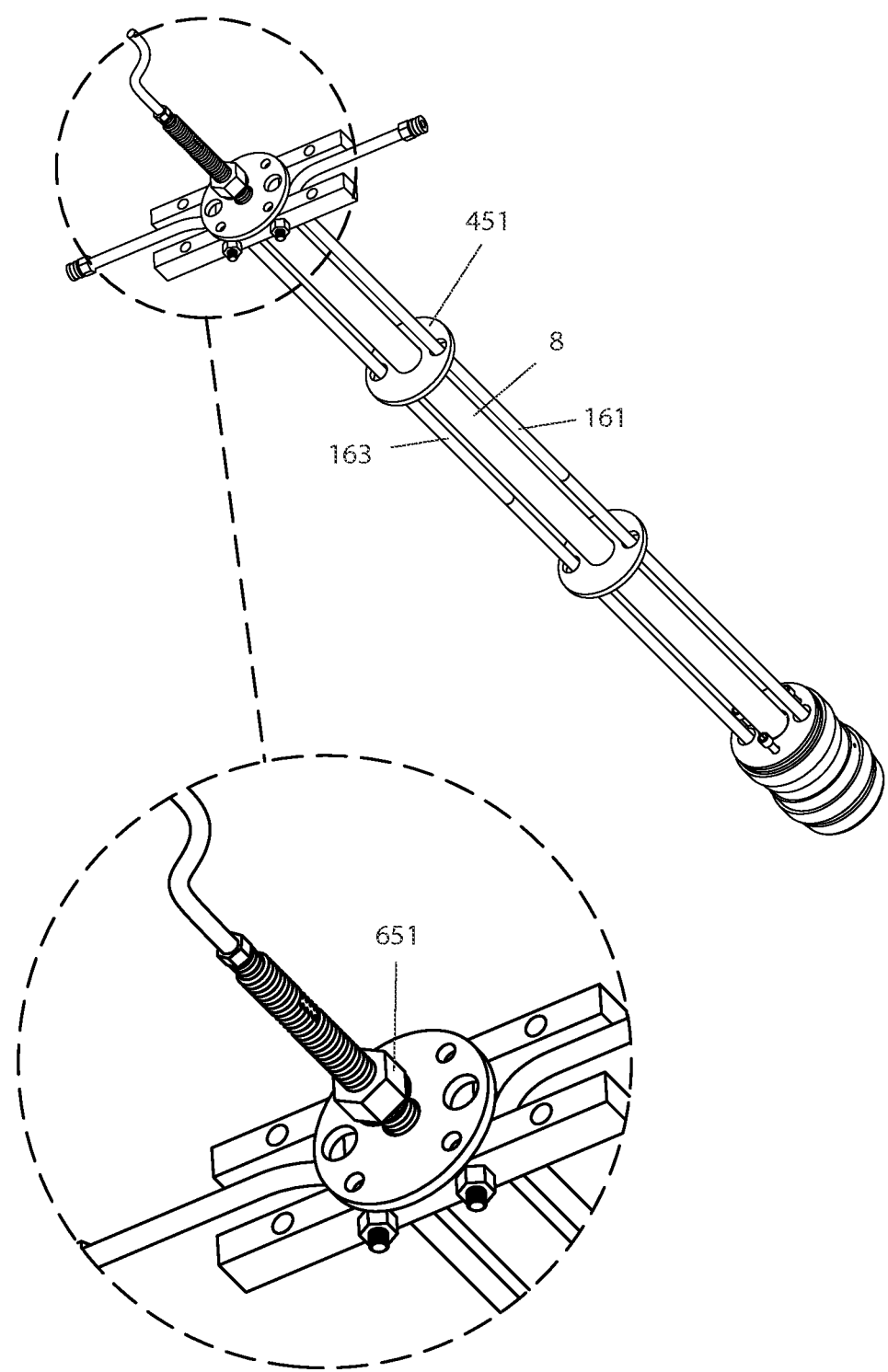
FIG. 23 is a perspective view of the tool, showing a venting tube being connected to the vent rod extension, including an enlarged perspective view of the venting tube connected to the vent rod extension.
Figure 24:
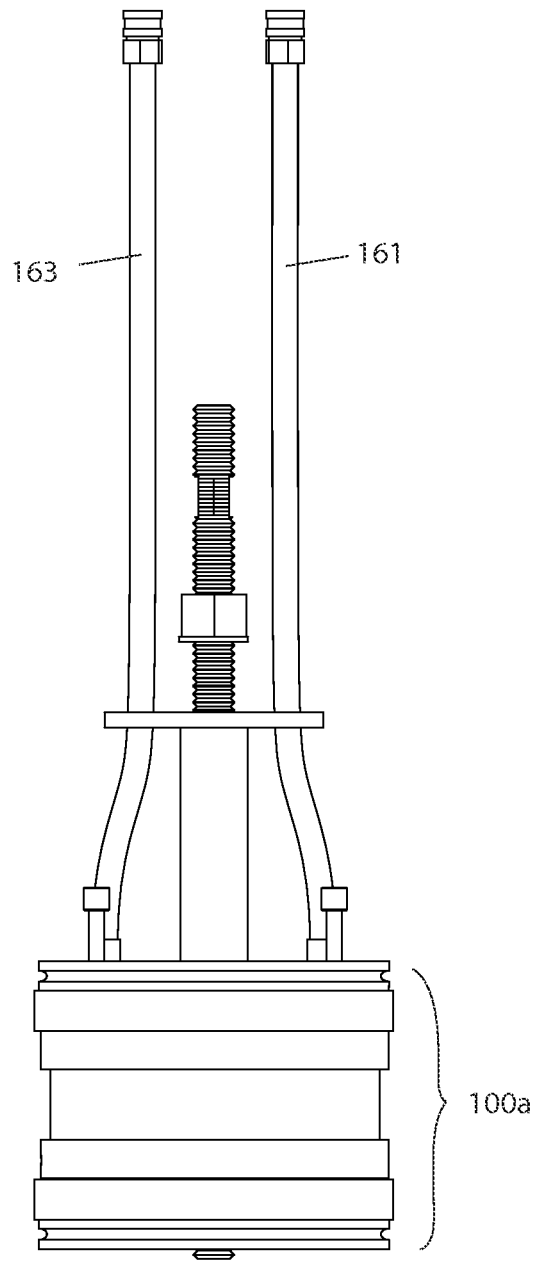
FIG. 24 is a side view of the isolation assembly.
Figure 25:
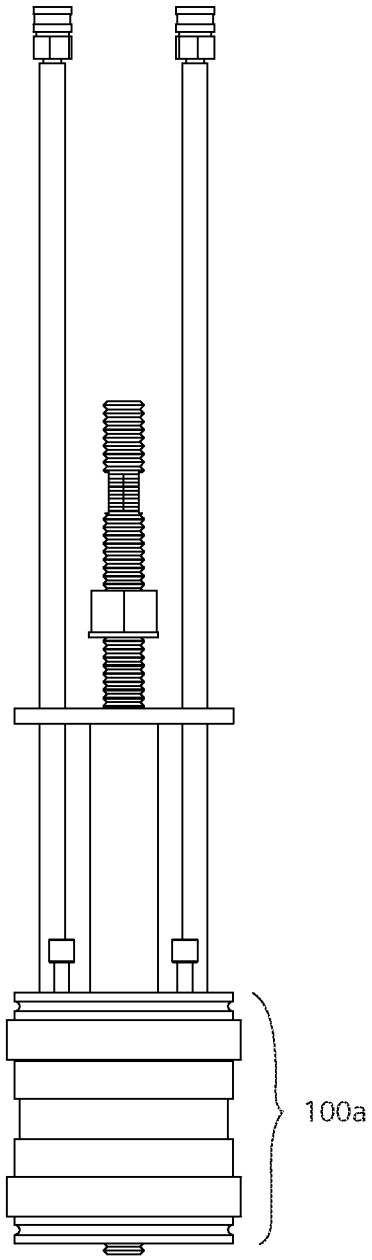
FIG. 25 is a side view of another embodiment of the isolation assembly.
Figure 26:
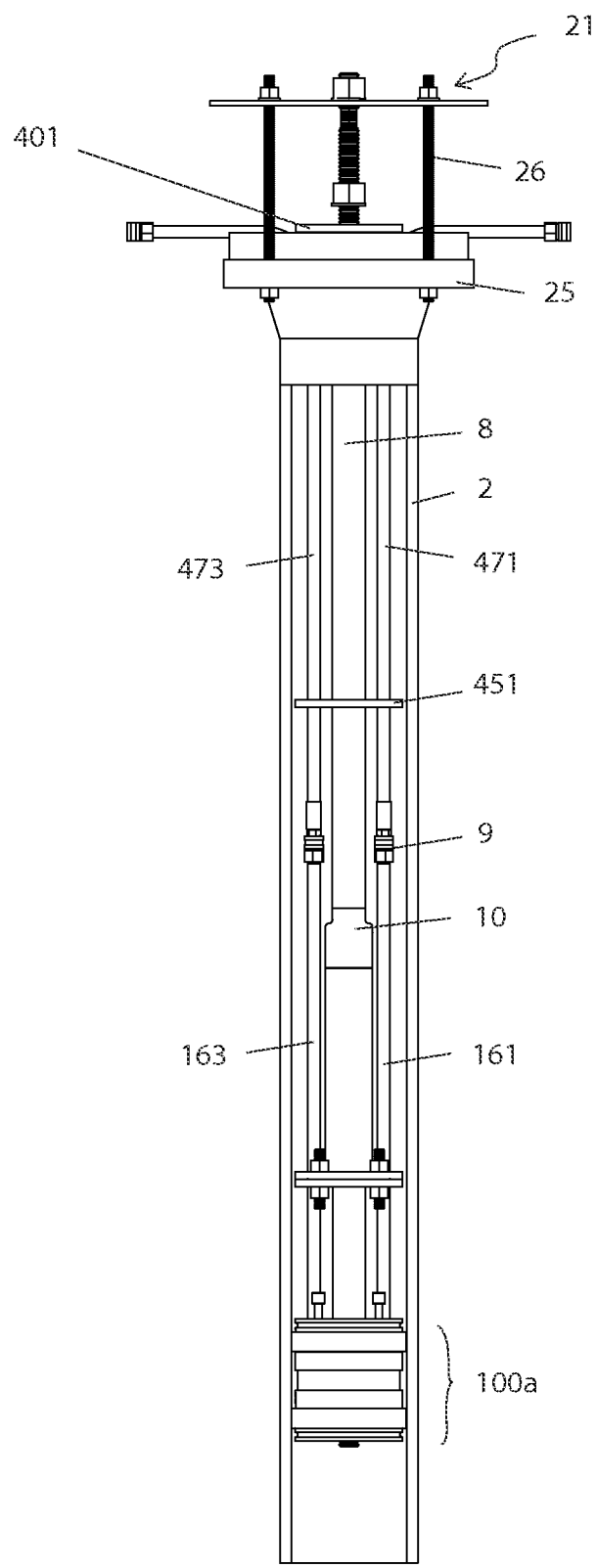
FIG. 26 is a partial cut-away side view of the tool in the process of being lowered into a pipe.

Having regard to FIG. 20, the isolation assembly's vent rod 311 is extended by adding tubular extension rods to form the string 17 using threaded couplings 341. Each coupling contains an O-ring to minimize the escape of flammable fluid passing through the bore 47 of the vent rod string 17. Similarly, the tubular flanged housing extensions or joints 431 are added and bolted end to end to front plate assembly 111 to form the housing string 8, as shown in FIG. 18. Finally, conduit extensions 471, 473 are added and connected with the first and second conduits 161, 163, as shown in FIG. 20, to extend the monitoring conduit assembly 24.

In summary, the isolation assembly 100a is progressively lowered into the riser bore 3 by adding short modular extensions to the isolation assembly vent rod 311, front plate assembly 111 and conduits 161, 163, thereby forming the vent rod string 17, housing string 8 and conduit assembly 24, 26, 27. Spacer plates 451 may be supplied to centralize the strings 17, 8 and minimize twisting of the strings.

Figure 32:
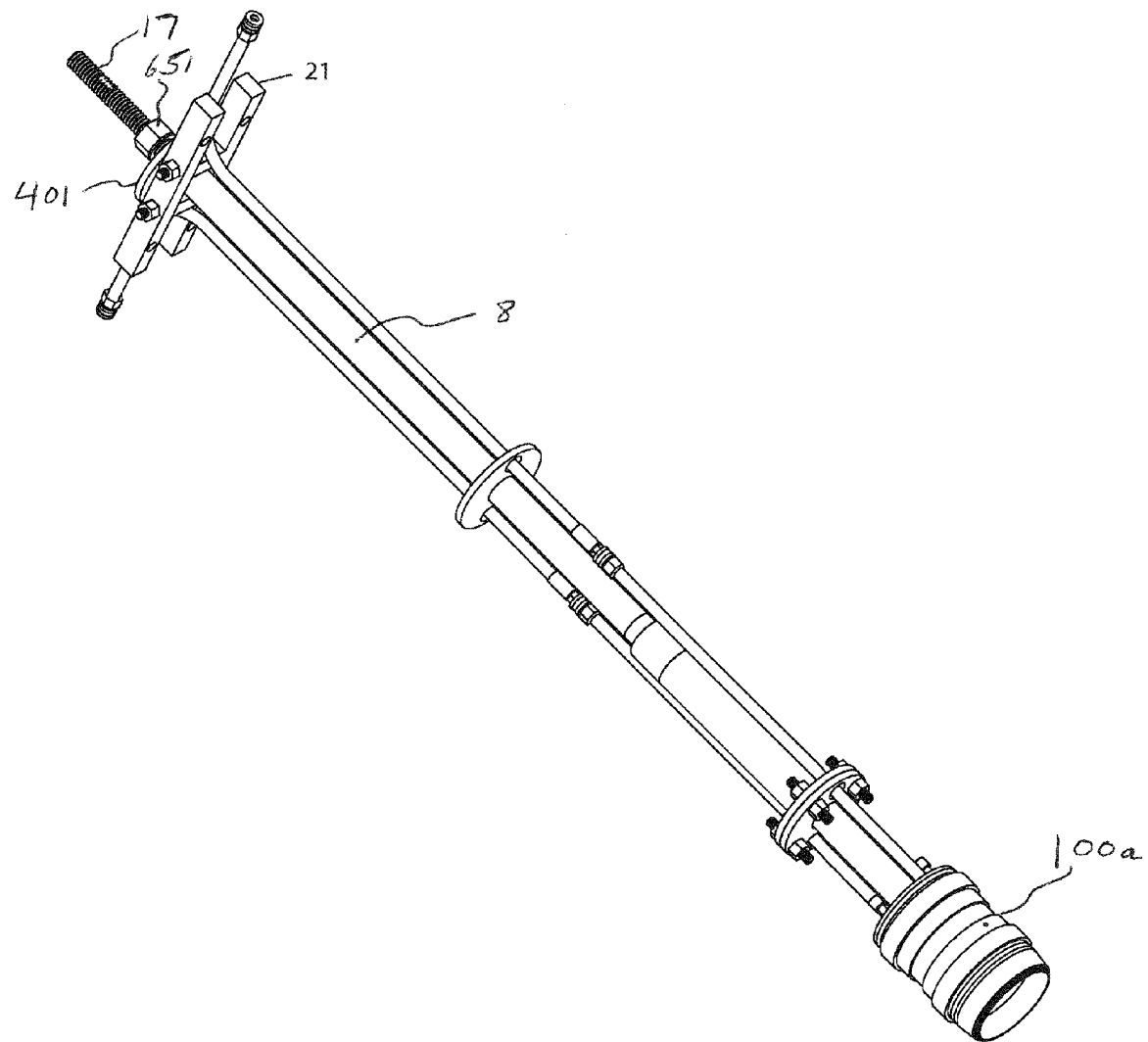
FIG. 32 is a perspective view of the tool.

As shown in FIGS. 1 and 32, a support frame 21 is positioned at ground surface, for supporting and anchoring the downwardly extending components. Commonly the riser pipe 2 will have a flange 25 at its upper end. The support frame 21 shown comprises an H-shaped lifting bridle adapted to seat on and be bolted to the pipe flange 25. A flange 401, forming part of the uppermost housing extension, seats on the bridle. The housing string 8 therefore is suspended from the flange 401 and anchored to the frame 21.

A long nut 651 is threaded onto the upper end of the vent rod string 17, which protrudes out of the upper end of the housing string 8. The nut 651 can be turned to pull and tension the vent rod string 17 to actuate and then lock the isolation assembly 100a in place. Alternatively a hydraulic tensioner can be used for the same purpose.

Figure 27:
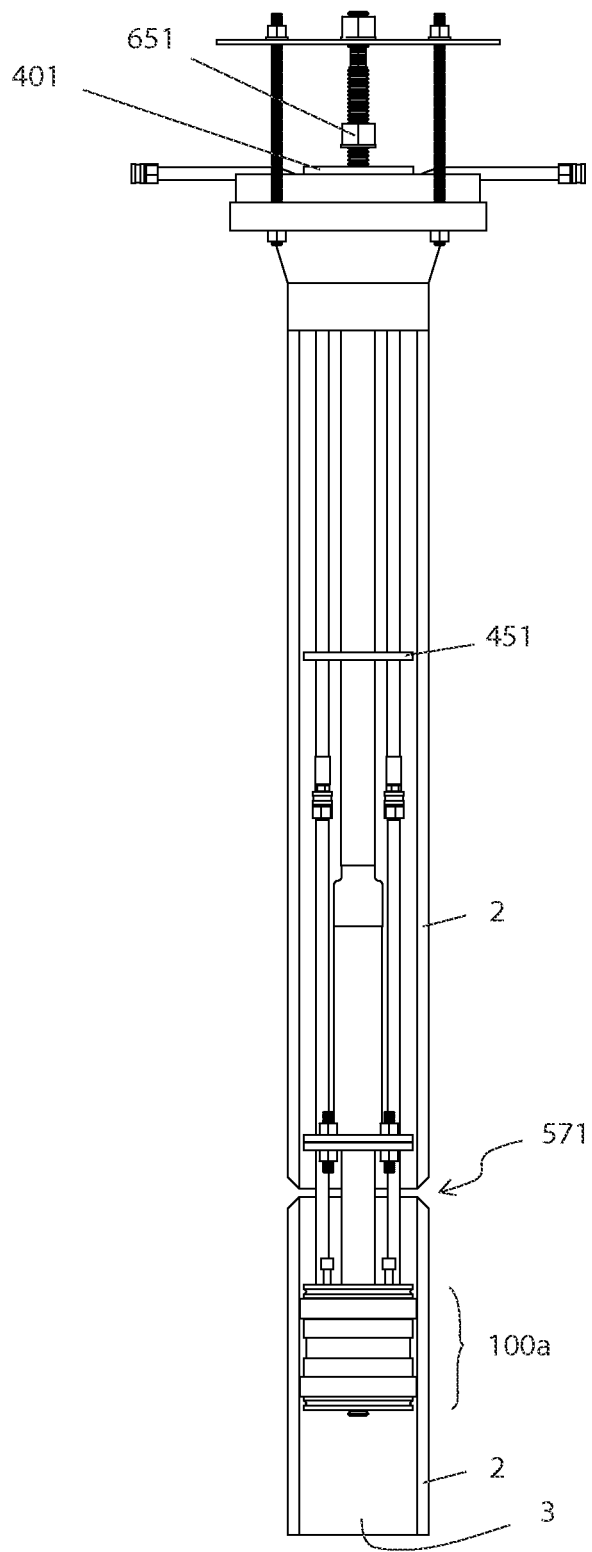
FIG. 27 is a partial cut-away side view of the tool positioned within the pipe for isolating a section of the pipe, wherein a cut line has been formed through the pipe side wall.
Figure 28:
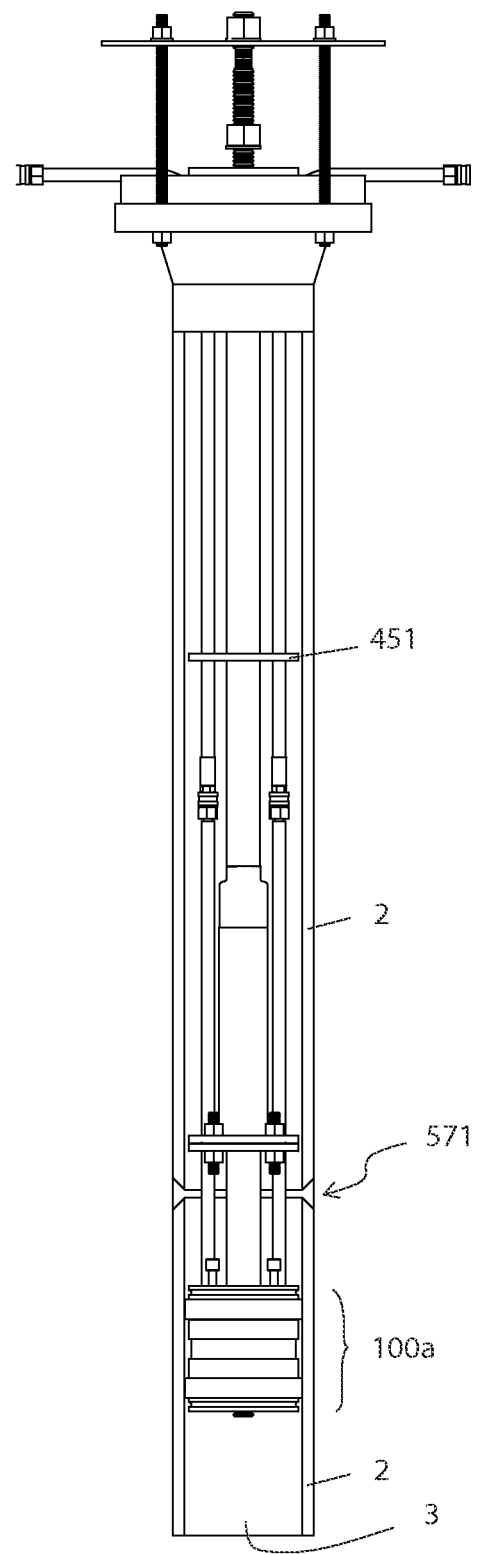
FIG. 28 is a partial cut-away side view of the tool positioned within the pipe for isolating a section of the pipe, wherein a weld has been formed at the cut line.
Figure 29:
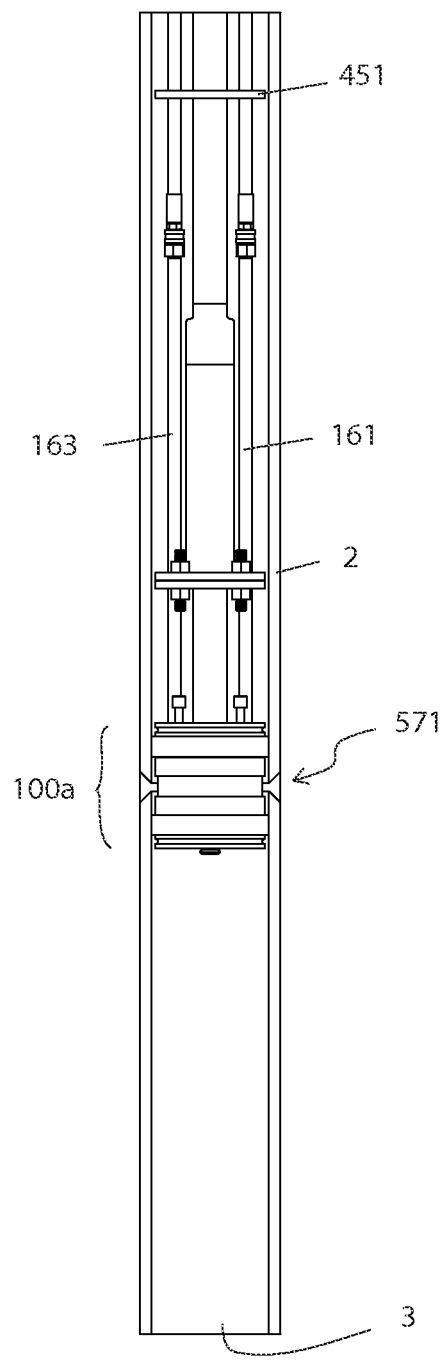
FIG. 29 is a partial cut-away side view of the tool positioned within the welded pipe for pressure testing the weld.
Figure 30:
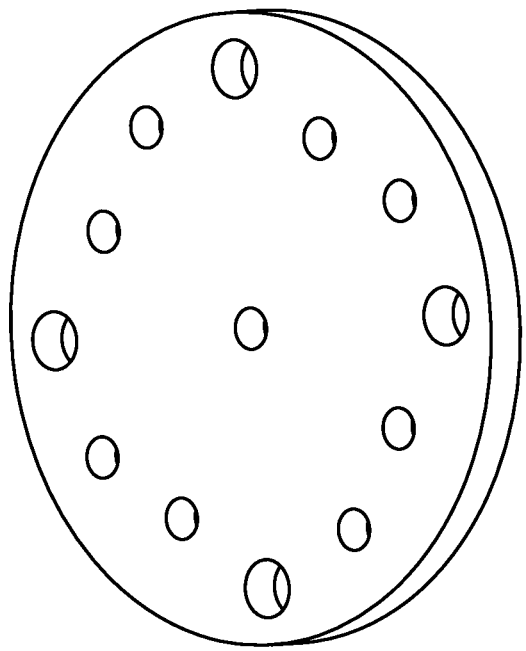
FIG. 30 is a perspective view of a blow out plate for attachment to the pipe flange as shown in FIG. 28.
Figure 31:
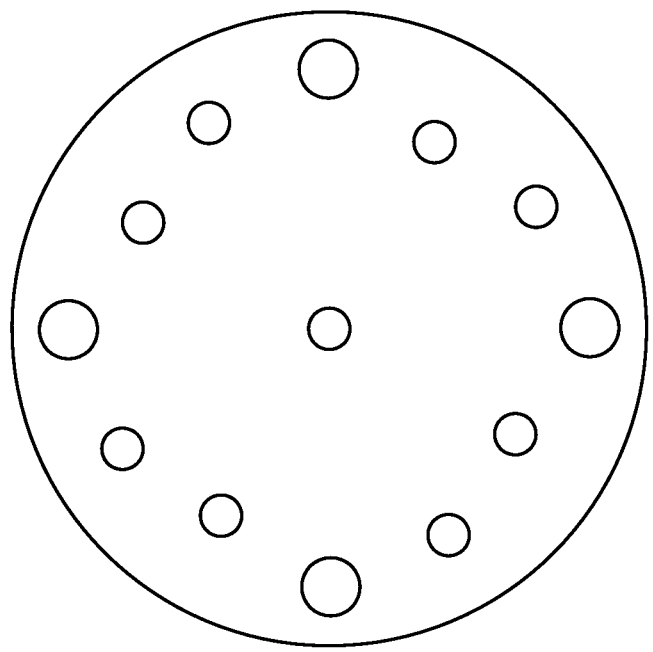
FIG. 31 is a front view of the blow out plate shown in FIG. 30

As shown in FIG. 27, the isolation assembly 100a will be positioned close to (usually about 1' below) the riser cut point 571.

As shown in FIG. 1, the monitoring means 24 comprises a pump 26 at ground surface, for supplying water under pressure into the supply conduit 161, for conveyance through the sealed spaced 63. A pressure gauge 27 shows the pressure of the water returning from the sealed space 63 through the return conduit 163. Observation of the gauge reading will inform if there is a reduction in pressure, thereby indicating seal leakage.

The isolation tool described is characterized by several advantages, including:
- it can be relatively quickly deployed—commonly this can be accomplished within a day;
- the provision of two axially separated seal elements provides a safety factor—if the primary lower seal begins to leak, there may still be an opportunity to terminate welding;
- the spaced double seals and conduit system provide a way to monitor for seal leakage;
- the modular design allows the tool to be inserted into the riser bore despite limited head room; and
- tieing together of components with the floating locking pins is beneficial in reducing the possibility of losing parts down the riser bore.

What is claimed:

1. A downhole isolation tool for use in providing a sealing barrier extending transversely across the bore of a pipe for isolating an upper section of the bore from fluid originating from a connected lower section of the bore, said pipe having a bore inlet at ground surface, said tool, when used in the pipe, comprising, in combination:
   a support frame engaging the pipe at the bore inlet, for supporting and anchoring downwardly extending segments of the tool;
   an isolation assembly positioned lengthwise in the pipe bore at depth, said assembly comprising a linear assemblage of components including a front plate, a front seal element, a central body, a back seal element and a back plate, said seal elements being axially spaced apart, resilient, deformable and annular, each said seal element being positioned between one end of the body and a plate, whereby, when the plates and body are compressed together, the seal elements are squeezed and deformed outwardly into sealing engagement with the pipe and thereby combine with the outer surface of the body and the inner surface of the pipe to form a sealed annular space;
   a tubular housing assembly suspending the isolation assembly in the pipe bore and positioning it at the desired operational depth, said housing assembly being anchored at its upper end to the support frame and connected at its lower end with the front plate, whereby the front plate is held stationary and fixed in place by said housing assembly;
   a tubular vent rod assembly connected with the back plate and slidably extending through the isolation assembly, housing assembly and bore inlet, said vent rod assembly extending to ground surface and forming a passageway communicating with the lower section of the pipe bore beneath the tool for venting fluid therefrom to ground surface;
   a tensioner connected with the vent rod assembly at ground surface and operative to draw said assembly upwardly to compress the plates and body together and deform the seal elements so that they sealably engage the pipe, said tensioner being lockable to fix said assembly in a tensioned state;
   a seal leakage monitoring assembly connected with the isolation assembly and comprising a conduit extending from ground surface for circulating pressurized liquid through the sealed annular space and back to ground surface;
   whereby the isolation assembly provides a sealing barrier having a pair of annular seal elements sealing against the pipe's inner surface at axially spaced apart positions, the vent rod assembly provides a passageway for segregated venting of fluid from the pipe's lower section bore through the barrier to ground surface and additionally functions when pulled and tensioned to actuate the isolation assembly, the housing assembly is operative to lower, hold and recover the isolation assembly and fixes the front plate in position to enable compression of the isolation assembly and the monitoring assembly functions to provide an indication as to whether a seal element is leaking.

2. The isolation tool as set forth in claim 1 wherein:
the pipe is an upwardly extending riser.

3. The isolation tool as set forth in claim 1 comprising:
a first set of floating locking pins, connecting the back plate with the body, for limiting the maximum separation distance between them while enabling the back plate and the body to be displaced toward and away from each other; and
a second set of floating locking pins, connecting the front plate with the body, for limiting the maximum separation distance between them while enabling the front plate and the body to be displaced toward and away from each other.

4. The isolation tool as set forth in claim 1, wherein:
the body and plates have opposed annular bevels arranged to squeeze and deform the annular seal elements into sealing engagement with the pipe when the body and plates are drawn together.

5. The isolation tool as set forth in claim 1, wherein:
the back plate and body are slideable along the vent rod assembly; and
the vent rod assembly is operative to pull the back plate, back seal element and body toward the fixed front plate to thereby compress the plates, body and seal elements together.

6. The isolation tool as set forth in claim 1, wherein:
the housing assembly comprises an elongate string of tubular joints joined end to end;
the vent rod assembly comprises a string of tubular rods joined end to end and extending through the string of tubular joints;

the back plate and body are slideable along the vent assembly; and the vent rod assembly is operative to draw the back plate, back seal element and body toward the fixed front plate to thereby compress the plates, body and seal elements together.

* * * * *